US012778340B2

(12) United States Patent
Dubanchet et al.

(10) Patent No.: US 12,778,340 B2
(45) Date of Patent: Nov. 3, 2026

(54) HOUSEHOLD ARTICLE COMPRISING A SOL-GEL NON-STICK COATING WITH A FINISH LAYER FREE OF SILICA AND OF COLLOIDAL METAL OXIDE

(71) Applicant: SEB S.A., Ecully (FR)

(72) Inventors: Aurelien Dubanchet, Gresy sur Aix (FR); Cyrielle Rudaz, Ecully Cedex (FR); Aurelien Berrux, Ecully Cedex (FR); Stephanie Le Bris, Chambery (FR)

(73) Assignee: SEB S.A., Ecully (FR)

( * ) Notice: Subject to any disclaimer, the term of this patent is extended or adjusted under 35 U.S.C. 154(b) by 0 days.

(21) Appl. No.: 19/107,927

(22) PCT Filed: Aug. 29, 2023

(86) PCT No.: PCT/FR2023/051305
§ 371 (c)(1),
(2) Date: Feb. 28, 2025

(87) PCT Pub. No.: WO2024/047310
PCT Pub. Date: Mar. 7, 2024

(65) Prior Publication Data

US 2026/0069078 A1 Mar. 12, 2026

(30) Foreign Application Priority Data

Aug. 30, 2022 (FR) ....................................... 2208659

(51) Int. Cl.

| | |
|---|---|
| ***A47J 36/02*** | (2006.01) |
| ***B05D 3/02*** | (2006.01) |
| ***B05D 5/08*** | (2006.01) |
| ***B05D 7/00*** | (2006.01) |
| ***C09D 183/06*** | (2006.01) |

(52) U.S. Cl.
CPC .......... *A47J 36/025* (2013.01); *B05D 3/0254* (2013.01); *B05D 5/08* (2013.01); *B05D 7/542* (2013.01); *C09D 183/06* (2013.01); *B05D 2518/12* (2013.01)

(58) Field of Classification Search
CPC ..... A47J 36/025; A47J 27/002; B05D 3/0254; B05D 5/08; B05D 7/542; B05D 2518/12; B05D 3/02; B05D 7/14; C09D 183/06; C09D 1/00; C09D 183/02; C09D 183/04; C01B 33/029; C08G 77/06; C08G 77/16; C08G 77/02; C08K 5/5415; C08K 5/544
See application file for complete search history.

(56) References Cited

U.S. PATENT DOCUMENTS

| | | | | | |
|---|---|---|---|---|---|
| 3,855,172 | A * | 12/1974 | Iler | B01J 13/14 | 524/789 |
| 4,010,242 | A * | 3/1977 | Iler | B01J 20/283 | 423/628 |
| 4,677,000 | A | 6/1987 | Gardaz et al. | | |
| 4,994,318 | A * | 2/1991 | Patel | C08J 3/095 | 428/913 |
| 5,385,964 | A * | 1/1995 | Basil | C09D 183/06 | 524/359 |
| 5,391,210 | A * | 2/1995 | Bilkadi | B24D 3/28 | 51/307 |
| 10,292,528 | B2 | 5/2019 | Perillon et al. | | |
| 2017/0020331 | A1 | 1/2017 | Berrux | | |
| 2022/0095829 | A1 | 3/2022 | Berrux | | |

FOREIGN PATENT DOCUMENTS

| | | | |
|---|---|---|---|
| EP | 2505619 | A1 | 10/2012 |
| FR | 2576253 | A1 | 7/1986 |
| FR | 2915205 | A1 | 10/2008 |

OTHER PUBLICATIONS

International Search Report for Application No. PCT/FR2023/051305 mailed Dec. 21, 2023. 4 pages.

* cited by examiner

*Primary Examiner* — Kareen K Thomas
(74) *Attorney, Agent, or Firm* — Lerner David LLP

(57) ABSTRACT

The present invention therefore relates to a sol-gel finish layer of a non-stick coating of a household article, said layer forming a cooking surface and being free of silica and of colloidal metal oxide.

11 Claims, No Drawings

HOUSEHOLD ARTICLE COMPRISING A SOL-GEL NON-STICK COATING WITH A FINISH LAYER FREE OF SILICA AND OF COLLOIDAL METAL OXIDE

CROSS-REFERENCE TO RELATED PATENT APPLICATIONS

The present application is a national phase entry under 35 U.S.C. § 371 of International Application No. PCT/FR2023/051305, filed Aug. 29, 2023, published in French, which claims priority from French Application No. 2208659, filed Aug. 30, 2022, all the disclosures of which are incorporated herein by reference.

TECHNICAL FIELD

The present invention relates generally to the field of household articles including a surface covered with a non-stick coating. More specifically, the present invention applies to the field of non-stick coatings for cooking surfaces of culinary articles and electrical cooking appliances. The present invention also relates to a method for manufacturing such articles.

STATE OF THE ART

In the field of culinary articles, it is known that there are coatings with non-stick properties applied to metal substrates or supports (aluminum, aluminum casting, stainless steel, cast steel, etc.) which are of various chemical natures.

More specifically, regarding the interior surfaces of these culinary articles intended to receive food, PTFE-type fluorinated resin coatings have been known for over 50 years, prized for their excellent non-stick properties. In recent years, coatings called "ceramic" coatings, based on sol-gel chemistry, have also appeared on the market, offering superior thermal resistance and surface hardness to PTFE coatings, while retaining easy-to-clean properties.

It has been found that the non-stick properties of these sol-gel coatings decrease over time with the use of the cookware. It is known to the person skilled in the art to add a silicone oil to compensate for this decrease in non-stick properties. However, the durability of these articles, in particular their non-stick properties, remains limited and unsatisfactory for the user.

In addition, to obtain good mechanical properties, it is widely known, and all sol-gel coating manufacturers do it, to add colloidal silica to their coating formulations to obtain a coating several microns thick without cracks, with high mechanical resistance in all layers of the sol-gel coating, including the finish layer.

However, it was noted by the Applicant that the addition of colloidal or micronic silica is unfavorable for the durability of the non-stick coating, in particular after prolonged contact with boiling water of the household article, by promoting the hydrolysis of part of the sol-gel network, leading to a drop in the non-stick coating.

SUMMARY OF THE INVENTION

The present invention aims at overcoming this disadvantage by addressing the technical problem of improving the durability of the non-stickiness of the sol-gel coating.

To this end, an object of the invention is to provide sol-gel non-stick coatings having improved durability without long-term alteration of the non-stick characteristics and visual properties of these coatings.

The applicant has developed a finish layer for sol-gel non-stick coatings that overcomes the above-mentioned disadvantages. Surprisingly, the inventors observed that the level of non-stick performance of the coating after the boiling water aging test is much higher when the finish layer is prepared without silica or colloidal metal oxide, that is to say no silica or colloidal metal oxide is added. Thus, the inventors were able to overcome a technical prejudice.

The advantages of a non-stick coating including this sol-gel finish layer according to the invention are that a household article provided with such a coating will retain its non-stick properties longer than other sol-gel coatings during use. The user will be able to keep their article for several additional years. In addition to the obvious gain from an economic and ecological point of view, the user will obtain a significantly improved level of satisfaction during use, while potentially using less fat.

In addition, another advantage of the invention is that the finish layer has optical properties compatible with the presence of visual attributes in the coating.

In addition, another advantage of the invention is that surprisingly satisfactory mechanical properties are retained and compatible with culinary use.

DETAILED DESCRIPTION OF THE INVENTION

The present invention therefore relates to a sol-gel finish layer of a non-stick coating of a household article, said layer forming a cooking surface and being free of silica and of colloidal metal oxide.

The term "layer" is understood to mean, within the meaning of the present invention, a continuous or discontinuous layer. A continuous layer (also called a monolithic layer) is a single whole forming a total flat area completely covering the surface on which it is placed. A discontinuous layer (or non-monolithic layer) may comprise several parts which are not therefore a single whole.

The terms "base layer", "primer layer", "bonding layer" or "bonding primer" mean all the layers from the first layer applied directly to the support (it is preferable that this layer adheres well to the support and provides all its mechanical properties to the coating: hardness, scratch resistance) to the last layer before the first layer of decoration.

Finish layer (sometimes called "finish") means within the meaning of the present invention the final layer of the coating, that is to say the surface layer of the coating intended to be in contact with the external environment, for example food. The finish layer is capable of being in contact by one of its faces with food to be cooked and thus forms a cooking face. This layer is preferably continuous and transparent, that is to say it can be traversed by light over the entire visible range. This finish layer leaves perfect visibility of the lower layers, while protecting them from abrasion and giving the coating its non-stick properties.

"Coating" means all the layers covering the metal support and adhering to this support.

By the term "non-stick coating", it is necessary to understand within the meaning of the invention a coating comprising at least one layer, generally several layers:

- a first layer applied directly to a support, which is often metallic, also called a bonding layer or bonding primer or primer layer; it is preferable that this layer adheres well to the support and provides all its mechanical properties to the coating: hardness, scratch resistance;

optionally a layer comprising a decorative pigment composition; this layer is also called a decorative layer or decoration;

a finish layer which is a surface layer; this layer leaves perfect visibility of the decorative layer while protecting it from abrasion and giving the coating its non-stick properties.

The finish layer according to the invention is easily distinguishable from the layers on which it is deposited by sectional observations under a scanning electron microscope (SEM). The thickness of the finish layer is measured at 20 random points on the section of the coating. The average thickness of the finish layer is obtained by averaging these 20 measurements.

The finish layer according to the invention is free of colloidal silica or micronic silica or mixtures thereof. This means that it does not contain colloidal or micronic silica or mixtures thereof. No colloidal or micronic silica has been added to the finish layer.

Advantageously, the finish layer according to the invention has a thickness of 1 to 15 μm, preferably 2 to 12 μm, more preferably 2 to 10 μm.

Advantageously, the first layer of the non-stick coating receives the finish layer, which may be of a different chemical nature and comprise, as a binder, a binder that is heat-stable at least at 300° C.

According to one variant, the heat-stable binder used in the layers of the non-stick coating, with the exception of the finish layer, may also be a binder that is heat-stable at least at 300° C., and may advantageously be selected from enamels, fluorocarbon resins or a mixture of fluorocarbon resins, alone or in a mixture with other heat-stable resins, polyester-silicone resins, silicone resins, fluorosilicones, polybenzimidazoles (PBI), polyimides, and inorganic or organic-inorganic hybrid polymers synthesized by sol-gel (sol-gel materials). The fluorocarbon resin may be polytetrafluoroethylene (PTFE), tetrafluoroethylene-perfluoropropylvinyl ether copolymer (PFA) or tetrafluoroethylene-hexafluoropropylene copolymer (FEP) or a mixture of these fluorocarbon resins. Other thermostable resins resistant to at least 200° C. can be a polyamide imide (PAI), a polyethylene sulfide (PES), a polyphenyl sulfide (PPS), a polyether ketone (PEK), a polyetherether ketone (PEEK) or a silicone. Finally, it is possible to use a silicone resin or a polyester-silicone resin as a thermostable binder.

Preferably, all layers of the non-stick coating are obtained by sol-gel method.

By sol-gel coating, it is understood within the meaning of the present invention, a coating synthesized by sol-gel method from a sol-gel composition. The coating thus obtained can be either organo-mineral or entirely mineral. By sol-gel method, it is understood within the meaning of the present invention, the principle of synthesis comprising the transformation of a solution based on precursors in liquid phase into a solid, by a set of chemical reactions (hydrolysis and condensation) at low temperature. The coating thus obtained can be either organo-mineral or entirely mineral.

Organo-mineral coating means a coating whose network is essentially inorganic, but which includes organic groups, in particular due to the precursors used and the curing temperature of the coating or due to the incorporation of organic fillers.

For the purposes of the present invention, entirely mineral coating means a coating based on an entirely inorganic material, free of any organic group. Such a coating can be obtained by sol-gel method, generally with a curing temperature of at least 400° C., or from precursors of the metal alkoxylate type and/or precursors of the metal polyalkoxylate type, generally with a curing temperature that can be less than 400° C.

The finish layer according to the invention is obtained from a sol-gel composition. This composition comprises at least one sol-gel precursor, of the metal alkoxide precursor type. As a sol-gel precursor suitable for the finish layer according to the invention, mention may be made of precursors of the metal alkoxylate type or sol-gel precursor of the metal polyalkoxylate type, mention may be made, among others, of aluminates, titanates, zirconates, vanadates, borates, polyalkoxysilanes and mixtures thereof. These compositions synthesized by sol-gel method from precursors of the metal polyalkoxylate type, preferably have a hybrid network, generally of silica with grafted alkyl groups.

The sol-gel (SG) composition of the finish layer is generally obtained from a sol-gel (SG) mixture comprising at least one metal alkoxide precursor.

Preferably, a metal alkoxide selected from the group consisting of:

precursors corresponding to the general formula $M_1(OR1)n$, precursors corresponding to the general formula $M_2(OR2)(n-1)R2'$, and precursors corresponding to the general formula $M_3(OR3)(n-2)R3'2$, with: R1, R2, R3 or R3' denoting an alkyl group, R2' denoting an alkyl or phenyl group, n being an integer corresponding to the maximum valence of the metals $M_1$, $M_2$ or $M_3$, $M_1$ $M_2$ or Ms designating a metal selected from Si, Zr, Ti, Sn, Al, Ce, V, Nb, Hf, Mg B or Ln.

The sol-gel finish layer according to the invention is advantageously obtained from a sol-gel precursor which is a polyalkoxysilane. Preferably, the sol-gel precursor is an alkoxysilane selected from the group consisting of methyltrimethoxysilane (MTMS), methyltriethoxysilane (MTES), dimethyldimethoxysilane, and mixtures thereof.

Preferably, the sol-gel precursor is methyltrimethoxysilane (MTMS).

Preferably, the sol-gel precursor of the finish layer is not tetraethoxysilane (TEOS). Moreover, according to one variant, the sol-gel composition of the finish layer according to the invention is free of tetraethoxysilane (TEOS).

The sol-gel composition of the finish layer may further comprise a solvent, in particular a solvent comprising at least one alcohol. A solvent comprising at least one alcohol is hereinafter referred to as an "alcoholic solvent".

An alcohol is preferably a C1-C6 alcohol. A C1-C6 alcohol is understood to be a saturated, linear or branched hydrocarbon chain, including 1 to 6 carbon atoms and comprising a hydroxyl group (—OH) attached to a carbon atom. Examples include ethanol, n-propanol, isopropanol.

The finish layer according to the invention may further comprise a hydroxylated silicone oil.

Advantageously, the composition of the finish layer is obtained by hydrolysis of the sol-gel precursor by adding water and an acid or base catalyst, then by condensation reaction leading to the production of a sol-gel non-stick coating composition.

The composition of the sol-gel finish layer may comprise an acid catalyst such as, for example, acetic acid, formic acid, citric acid, hydrochloric acid, tartaric acid or mixtures thereof.

The composition of the sol-gel finish layer may comprise a base catalyst such as sodium hydroxide NaOH, potassium hydroxide KOH, ammonia $NH_4$ or mixtures thereof.

The composition of the sol-gel finish layer may further comprise a pigmentary filler. As pigmentary fillers that can be used in the context of the present invention, there may be mentioned in particular coated or uncoated mica, titanium dioxide, mixed oxides (spinels), aluminosilicates, iron oxides, carbon black, perylene red, metallic flakes, pigments, thermochromic organic dyes or mixtures thereof.

These pigment fillers have the main effect of providing color, and in addition of improving heat diffusion, improving the hardness (and durability) of the sol-gel non-stick coating and having lubricating properties.

The composition of the sol-gel finish layer may further comprise at least one inorganic filler. These are, for example, fillers selected from boron nitride, molybdenum sulfide, graphite and mixtures thereof.

The composition of the sol-gel finish layer may further comprise at least one organic filler.

The finish layer according to the invention described above can be used to cover a household article and obtain a sol-gel non-stick coating. Thus, the invention also relates to the use of a sol-gel finish layer forming a cooking surface and being free of silica and of colloidal metal oxide to cover a household article and obtain a non-stick coating.

The present invention also relates to a household article comprising a support covered with a sol-gel non-stick coating, said coating comprising at least two layers, a first sol-gel layer in contact with the support, and a second sol-gel finish layer free of silica and of colloidal metal oxide. Advantageously, the household article according to the invention is in particular a culinary article.

For the purposes of the present invention, the term household article means an object intended to meet the domestic needs of everyday life, in particular an article intended to receive heat treatment or intended to produce heat. In particular, it may be a culinary article or a household appliance.

Intended to receive heat treatment means within the meaning of the present invention an object which will be heated by an external heating system, in particular a culinary article such as frying pans, saucepans, sauté pans, woks, crepe pans, stewpots, cooking pots, cocottes, braising pans, daubiere, barbecue grills, baking molds, fondue pots and which is capable of transmitting the heat energy provided by this external heating system to a material or food in contact with said object.

For the purposes of the present invention, intended to produce heat means a heating object having its own heating system, in particular a household appliance, such as electrical cooking appliances such as a saucepan.

The expression "electric cooking appliance" should be understood within the meaning of the present invention to mean a heating object having its own heating system, such as an electric crepe maker, electric raclette appliance, electric fondue appliance, electric grill, electric plancha, electric cooker, bread maker, electric pressure cooking appliance.

The household article according to the invention comprising a support coated with a sol-gel non-stick coating. After heat treatment, the sol-gel coating adheres to the support of the household article according to the invention to form an article whose support is coated with a sol-gel coating.

Advantageously, the support of the household article may be made of inorganic material, such as glass or ceramic, or of organic material such as plastic, or of metallic material, or of terracotta.

Preferably, the support may be metallic and may be made of aluminum or aluminum alloy, anodized or not, optionally polished, brushed, sandblasted or microblasted, or of steel optionally polished, brushed, sandblasted or microblasted, or of stainless steel optionally polished, brushed, sandblasted or microblasted, or of cast steel, aluminum or iron, or of copper optionally hammered or polished.

Preferably, the support may be metallic and may comprise alternating layers of metal and/or metal alloy, or is a cap of cast aluminum, aluminum or aluminum alloys lined with an outer base of stainless steel. The metal support may be a two-layer or three-layer support, these multilayers being obtainable for example by co-lamination, by hot diffusion under load (solid state bonding) or by hot or cold impact bonding.

The glass suitable as a coating support for the household article according to the invention may be tempered borosilicate or glass-ceramic, which have the advantage of good mechanical strength and good resistance to thermal shocks. This type of support may be obtained from glassmakers who have mastered the formulations, molding and tempering. The molding operation and application of the coating composition may be separate, which may be advantageous for implementing a discontinuous method. A chemical or mechanical treatment of the surface may possibly be useful for obtaining a reinforced bond between the sol-gel coating and the glass support.

Stoneware and ceramics may also be suitable as coating supports for the household article according to the invention. Ceramics called "all-fire" ceramics generally use specific products, the shaping of which requires a great deal of know-how. The advantage of these materials is that they can withstand high thermal shocks. These materials are preferably molded by gravity casting or by conventional or isostatic pressure for better productivity. The molding techniques allow to obtain various shapes, then the molded materials are dried and fired, for example in stages up to 1400° C. in 4 hours. These raw objects, also called shards (because they are not coated), have a certain interesting roughness related to the molding and which it is preferable to control for the application of the sol-gel coating.

Advantageously, the support is a hollow metal cap which comprises a bottom and a side wall rising from the bottom, said cap having a concave inner face adapted to receive food and a convex outer face intended to be disposed towards the heating means or a heat source. Advantageously, the inner face or the bottom are coated with a sol-gel coating comprising successively, from the cap, at least two layers, the first sol-gel layer in contact with the cap or support, and the second sol-gel layer is a finish layer free of silica or colloidal metal oxide.

Advantageously, the sol-gel non-stick coating of the household article according to the invention is disposed on at least one of the two faces of the support of the culinary article, preferably on the inner face in contact with the food. Optionally, the outer face of the support of the household article according to the invention is coated with a sol-gel coating, in this case the entire support of the culinary article is coated.

Preferably, the sol-gel non-stick coating of the household article according to the invention can be disposed on a support either in a single layer or in several layers superimposed on each other. The sol-gel coating can be in the form of a continuous or discontinuous layer, in particular if it comprises a decoration. Also preferably, the decoration is applied by screen printing or pad printing. In particular, the decoration can be applied according to the method described in French patent FR2576253. The term “decoration” or “decorative layer” means one or more continuous or discontinuous layers comprising a pigment composition. The decoration can be in the form of one or more patterns, of one or more colors. A decoration is visible to the user distinctly with the naked eye and at a conventional distance from which the household article is used.

The sol-gel non-stick coating covering the support of the household article according to the invention comprises at least two layers, a first sol-gel layer in contact with the support (primary layer), and a second sol-gel layer free of silica or colloidal metal oxide.

The first layer of the sol-gel non-stick coating of the household article according to the invention is also called a primer layer (sometimes referred to as a “bonding primer” or “primer”). This primer layer is intended to be in contact with the surface of the support of the article on which the coating will be deposited. Advantageously, this primer layer allows the successive layers of the coating to adhere to the support. Furthermore, the sol-gel non-stick coating of the household article according to the invention may also comprise an intermediate layer (sometimes referred to as a “midcoat”) between the primer layer and the finish layer.

Advantageously, the composition of the first sol-gel layer may comprise a solution based on liquid phase precursors comprising sol-gel precursors of the metal alkoxylate type and/or sol-gel precursors of the metal polyalkoxylate type.

Preferably, a metal alkoxylate selected from the group consisting of:

- precursors corresponding to the general formula $M_1(OR_1)n$,
- precursors corresponding to the general formula $M_2(OR_2)(n-1)R_2$, and
- precursors corresponding to the general formula $M_3(OR_3)(n-2)R_{3'2}$, with:
- $R_1$, $R_2$, $R_3$, or $R_{3'}$ denoting an alkyl group,
- $R_{2'}$ denoting an alkyl or phenyl group,
- n being an integer corresponding to the maximum valence of the metals $M_1$, $M_2$ or $M_3$,
- $M_1$ $M_2$ or $M_3$ designating a metal selected from Si, Zr, Ti, Sn, Al, Ce, V, Nb, Hf, Mg, B or Ln.

Advantageously, the metal alkoxylate of the sol-gel solution of the composition of the first layer is an alkoxysilane. As alkoxysilanes that can be used in the sol-gel solution, mention may in particular be made of methyltrimethoxysilane (MTMS), tetraethoxysilane (TEOS), methyltriethoxysilane (MTES), dimethyldimethoxysilane, and mixtures thereof.

Preferably, the first layer which is intended to be applied to the support may advantageously comprise methyltrimethoxysilane (MTMS) as a sol-gel precursor.

Advantageously, the composition of the first sol-gel layer comprises at least one sol-gel precursor of the metal alkoxylate type as described above and at least 2% by mass relative to the total mass of the composition of at least one colloidal metal oxide dispersed in said composition.

Advantageously, the composition of the first sol-gel layer is obtained by hydrolysis of the sol-gel precursor by adding water and an acid or base catalyst, then by condensation reaction leading to the production of a sol-gel non-stick coating composition.

The composition of the first sol-gel layer may comprise an acid catalyst such as, for example, acetic acid, formic acid, citric acid, hydrochloric acid, tartaric acid or mixtures thereof.

The composition of the first sol-gel layer may comprise a base catalyst such as sodium hydroxide NaOH, potassium hydroxide KOH, ammonia $NH_4$ or mixtures thereof.

The composition of the first sol-gel layer may further comprise a pigmentary filler. As pigmentary fillers that can be used in the context of the present invention, mention may in particular be made of coated or uncoated mica, titanium dioxide, mixed oxides (spinels), aluminosilicates, iron oxides, carbon black, perylene red, metallic flakes, pigments, thermochromic organic dyes or mixtures thereof.

These pigment fillers have the main effect of providing color, and in addition of improving heat diffusion, improving the hardness (and durability) of the sol-gel non-stick coating and having lubricating properties.

The composition of the first sol-gel layer may further comprise at least one inorganic filler. These are, for example, fillers selected from boron nitride, molybdenum sulfide, graphite and mixtures thereof.

The composition of the first sol-gel layer may further comprise at least one organic filler.

The composition of the first sol-gel layer may further comprise at least one reactive or non-reactive silicone oil, for example a polydimethylsiloxane oil (PDMS oil).

The second layer of the sol-gel non-stick coating of the household article according to the invention is a sol-gel layer free of silica and of colloidal metal oxide.

Advantageously, the second layer of the sol-gel non-stick coating of the household article according to the invention is free of colloidal silica or micronic silica. Moreover, according to one variant, the second sol-gel layer of the coating of the household article according to the invention is free of tetraethoxysilane (TEOS). The sol-gel composition of this second layer is free of colloidal metal oxide. Preferably, the sol-gel precursor of the second layer is not tetraethoxysilane (TEOS).

Preferably, the preferred sol-gel precursor of the second layer is methyltrimethoxysilane (MTMS).

Advantageously, the second sol-gel layer of the sol-gel non-stick coating of the household article according to the invention is a finish layer having the same characteristics as the finish layer described above.

Advantageously, the second sol-gel layer of the sol-gel non-stick coating of the household article according to the invention has a thickness of 1 to 15 μm, preferably 2 to 12 μm, more preferably 2 to 10 μm.

Advantageously, the composition of the second sol-gel layer may comprise a solution based on liquid phase precursors comprising sol-gel precursors of the metal alkoxylate type and/or sol-gel precursors of the metal polyalkoxylate type.

Preferably, a metal alkoxylate selected from the group consisting of:

- precursors corresponding to the general formula $M_2(OR_2)(n-1)R_2$, and
- precursors corresponding to the general formula $M_3(OR_3)(n-2)R_{3'2}$, with:
- $R_2$, $R_3$ or $R_{3'}$ denoting an alkyl group,
- $R_{2'}$ denoting an alkyl or phenyl group,
- n being an integer corresponding to the maximum valence of the metals $M_2$ or $M_3$,
- $M_2$ or $M_3$ designating a metal selected from Si, Zr, Ti, Sn, Al, Ce, V, Nb, Hf, Mg or Ln.

Advantageously, the metal alkoxylate of the sol-gel solution of the second layer is an alkoxysilane. As preferred alkoxysilanes, mention may in particular be made of methyltrimethoxysilane (MTMS), methyltriethoxysilane (MTES), dimethyldimethoxysilane, and mixtures thereof.

Preferably, the composition of the second sol-gel layer does not comprise tetraethoxysilane (TEOS) as sol-gel precursors.

The invention also relates to a method for manufacturing a household article according to the invention comprising the following successive steps:

i. having a support comprising two opposite faces;
ii. shaping the support to obtain a concave face and a convex face;
iii. successively applying to the concave face of the support a sol-gel coating composition then a finish layer according to the invention;
iv. applying to the article resulting from step (iii) a heat treatment at a temperature comprised from 200 to 400° C.;
v. obtaining a household article whose support is coated with a sol-gel non-stick coating.

The implementation of this method allows to obtain an article whose support is coated with a sol-gel non-stick coating.

The support implemented in step (i) and (ii) is that described above.

Advantageously, the method according to the invention may further comprise, prior to step i), a step of surface treatment of the face of the support intended to be coated. This surface treatment may consist of a chemical treatment (chemical stripping in particular) or mechanical treatment (sandblasting, brushing, emery, shot blasting for example) or else physical treatment (in particular by plasma), in order to create a roughness of the surface of the support which will be favorable to the adhesion of the sol-gel coating layer. The surface treatment may furthermore be advantageously preceded by a degreasing operation intended to clean the surface.

Advantageously, the support is optionally cleaned and heated before applying the composition according to step (iii). The heating temperature can be comprised between 4° and 80° C., this preheating prevents dripping during application.

Advantageously, step (iii) of the method according to the invention may comprise an intermediate drying step which takes place after the application of the sol-gel coating composition and before the application of the finish layer.

The sol-gel coating composition may be applied to the substrate by spraying or by any other application mode, such as by dipping, pad, brush, roller, inkjet, curtain, spin coating or screen printing. However, spraying, for example by means of a gun, has the advantage of forming a homogeneous and continuous layer, which, after curing, forms a continuous, uniformly thick and impermeable coating.

The application on the support, in step (iii) of the method according to the invention, can take place by screen printing, roller, inkjet, spraying or curtain.

The application on the support, in step (iii) of the method according to the invention, can take place by pyrolysis spraying comprising the spraying or nebulization in the form of droplets of solution of the sol-gel coating composition. The application on the support, in step (iii) of the method according to the invention, can also take place by flat coating techniques, which allow on the one hand a significant saving in coating consumption from an industrial point of view, and on the other hand the elimination of the problem of spraying outside the article (or "over spray").

Advantageously, step (iv) of the method according to the invention can take place at a temperature of 200 to 400° C., in particular at a temperature of 220 to 350° C., more particularly at a temperature of 250 to 320° C., preferably at 300° C.

A drying step may be considered between step (iii) and (iv). Any means of drying may be considered, drying in an oven, drying by ultraviolet or infrared radiation, plasma drying, drying in the open air or a combination of these heating means.

This optional drying step can allow solvents to evaporate and avoid the stresses associated with densification/curing of the coating.

According to another variant, it may be considered that the method further comprises, between step iii) of application of the sol-gel coating composition to the support and step iv) of heat treatment, the following two successive steps:

iii-1) a step of pre-densification of the support thus coated to obtain a sol-gel coating layer having a pencil hardness in the range 4B to 4H; then
iii-2) a step of stamping the coated support until the final shape of the culinary article is obtained, with an inner face capable of receiving food and an outer face intended to be disposed on the side of a heat source, the stamped face being able to be either the face provided with the sol-gel coating layer or the face opposite thereto. According to this variant, the shaping step ii) is omitted.

For the purposes of the present invention, pencil hardness is understood to mean the resistance of coatings or lacquers to surface scratches. This hardness therefore indirectly reflects a state of progress of the sol-gel condensation. This step of pre-densification of the sol-gel coating layer may advantageously consist of a drying step at a temperature comprised between 20° C. and 150° C., and more particularly by forced drying at a temperature comprised between 80° C. and 150° C. in a conventional curing oven. Preferably, in such a configuration with forced drying of the method according to the invention, the drying time may be comprised between 30 seconds and 5 minutes.

After step (v) of the method according to the invention, an article is obtained whose support is coated with a sol-gel coating.

The total thickness of the coating after implementing the method according to the invention may be comprised between 1 and 200 μm, in particular comprised between 2 and 100 μm, preferably comprised between 2 and 80 μm.

EXAMPLES

The purposes, aspects and advantages of the present invention will be better understood from the description given below of a particular embodiment of the invention presented by way of non-limiting example.

Of course, the invention is in no way limited to the embodiment described and illustrated, which has been given only as an example. Modifications remain possible, in particular from the point of view of the constitution of the various elements or by substitution of technical equivalents, without departing from the scope of protection of the invention.

Example 1 According to the Invention: Preparation of a Coating Having a Black Sol-Gel Primer and a Glittery Finish Layer The black primer formulation (first coat) is prepared from a three-component system: part A, part B and part C.

Part A is a colloidal silica, with a particle size less than 200 nm, which can optionally be impregnated with a hydrophobic compound such as PDMS oil.

Part B incorporates the reactive silane MTMS and the acid catalyst.

Part C incorporates pigments, fillers, solvents, wetting agent, and PDMS oil.

It should be noted that PDMS oil can also be introduced into part B.

Example 1: Black Primer

TABLE 1

| Components | Part | Mass in g. |
|---|---|---|
| Colloidal silica (30%) | A | 41.2 |
| MTMS | B | 29.1 |
| Acetic acid | B | 0.9 |
| Isopropanol | C | 3.3 |
| Butyl glycol | C | 0.9 |
| Hydroxylated PDMS oil | C | 1.2 |
| Black pigment | C | 15.5 |
| Micro alumina | C | 7.8 |
| Wetting agent | C | 0.1 |
| TOTAL | | 100 |

The finish formulation (finish layer or second layer) according to the invention is also prepared from a three-component system, except that in part A there is only demineralized water, and it is free of colloidal silica.

Part B comprises the reactive silane MTMS and the acid catalyst.

Part C comprises solvents, wetting agent, glitter, and PDMS oil.

It should be noted that PDMS oil can also be introduced into part B.

Example 1: Glittery Finish Layer According to the Invention

TABLE 2

| Components | Part | Mass in g. |
|---|---|---|
| Demineralized water | A | 27.6 |
| MTMS | B | 48.9 |
| Acetic acid | B | 2.3 |
| Isopropanol | C | 10.5 |
| Butyl glycol | C | 9.2 |
| Hydroxylated PDMS oil | C | 1.2 |
| Mica glitter | C | 0.2 |
| Wetting agent | C | 0.1 |

The method is as follows:

Part A (colloidal silica for the primer or demineralized water for the finish) is stirred with a shear blade and a speed of 1000 rpm, sufficient to obtain a clear vortex.

Part B is prepared separately by mixing the silane with the acid, then introduced with stirring into part A: the hydrolysis reaction of the MTMS then begins, and must continue for at least 2 hours.

Then, part C is introduced to this mixture by incorporating the components one by one, still stirring. It should be noted that it is also possible to pre-mix all the components of part C separately, before introducing this paste into the A+B mixture after the 2 hours of reaction.

Once all the components are mixed, stirring is continued for 30 minutes, then the formulation is stored in a closed glass bottle.

Also note, in terms of the mixing method, that it is also possible to first introduce the components of part C into part A, leave for 30 minutes of stirring, then introduce part B alone and mix for 2 hours for the sol-gel reaction.

The mixture is then left at room temperature for 24 hours before application. The shelf life of this formulation is at least 48 hours.

The mixture can also be stored in the refrigerator at 5° C.: in this case, its shelf life is increased to at least 72 hours.

The primary mixture is then filtered with a 50 micron filter before being applied by spray on a sandblasted and degreased and previously shaped aluminum support. The support is preheated to 55° C. to avoid any dripping during coating.

The finish is then filtered with a 90 micron filter, and applied to the wet primer layer.

A drying step at a temperature below 100° C. of the primer before application of the finish can also be carried out, for example in the case where it is desired to pad print a functional or non-functional decoration between the two layers of the coating.

The primer will be 30 to 40 microns dry thickness, and the finish will be 3 to 10 microns dry thickness.

The sol-gel coating is cured at 300° C., with a gradual rise and a 10-minute hold at this temperature of 300° C.

Comparative Example 2: Preparation of a Coating Including a Black Sol-Gel Primer and a Glittery Finish Layer with Colloidal Silica This comparative example uses the formulations based on MTMS, with the same composition and method as Example 1 for the primer layer, but with a finish layer containing colloidal silica.

Comparative Example: Glittery Finish Layer Containing Silica

TABLE 3

| Components | Part | Mass in g. |
|---|---|---|
| Colloidal silica (40%) | A | 38.9 |
| MTMS | B | 41.3 |
| Acetic acid | B | 2 |
| Isopropanol | C | 7.8 |
| Butyl glycol | C | 7.7 |
| Hydroxylated PDMS oil | C | 2 |
| Mica glitter | C | 0.2 |
| Wetting agent | C | 0.1 |

The method for formulating the finish does not differ from Example 1.

The primary mixture is then filtered with a 50 micron filter before being applied by spray on a sandblasted and degreased aluminum support, preheated to 55° C. to avoid any dripping during coating.

The finish is then filtered with a 90 micron filter, and applied to the wet primer layer.

A drying step at a temperature below 100° C. of the primer before application of the finish can also be carried out, for example in the case where it is desired to pad print a functional or non-functional decoration between the two coating layers.

The primer will be 30 to 40 microns dry thickness, and the finish will be 5 to 15 microns dry thickness.

The sol-gel coating is cured at 300° C., with a gradual rise and a 10-minute hold at this temperature of 300° C.

Non-Stickiness Test Results

Regarding the evaluation of the non-stick properties of the coatings, use is made of the "FAN" test protocol to judge the cleanability and staining of the sol-gel layers obtained. The objective of this test is to highlight the ease of cleaning (FAN, adaptation of standard NF A 92-032) of the different coatings. 5 different foods with cooking at 250° C. for 30 minutes in an oven: Milk+salt, Viandox, Pulco, egg yolk and Ketchup are placed in contact, in 5 calibrated cylinders.

Then, cleaning with a dampened blue Scotch Brite sponge (abrasive side) is carried out.

Depending on the weight required to completely clean the food, a score from 1 (worst) to 5 (easiest to clean) is assigned to each food. The coating is thus given an overall score, after addition, ranging from 5 to 25 points.

Non-Stickiness when New:

The non-stickiness when new was already good for formulations with finish containing colloidal silica, so it is rather a question of checking that this property when new is retained:

TABLE 4

| Example | Coating Configuration | FAN score/25 When new |
|---|---|---|
| Example 1 | MTMS bi-layer according to the invention, pan 1 | 21 |
| | MTMS bi-layer according to the invention, pan 2 | 22 |
| Comparative | MTMS/Silica/PDMS bi-layer, pan 1 | 22 |
| example 2 | MTMS/Silica/PDMS bi-layer, pan 2 | 21 |

It is therefore noted that the level of non-stickiness remains high, with a FAN>20 points, on the ceramic coating prepared according to the invention.

Non-Stickiness after Aging in Boiling Water:

In order to simulate aging due to aqueous cooking, an aging test is carried out in boiling water.

The test procedure is as follows:

- washing the pan before testing with lukewarm water, yellow side of the sponge and detergent;
- filling with tap water, to three quarters of the volume of the article, and heating on an electric hotplate until boiling;
- when boiling, maintaining heating and starting the stopwatch for 2 hours;
- end of test after 2 hours: washing the article in lukewarm water, yellow side of the sponge and detergent to remove surface limescale.

The FAN test is then carried out to evaluate the level of non-stick properties of the coating.

TABLE 5

| Example | Coating Configuration | FAN score/25 |
|---|---|---|
| Example 1 | MTMS bi-layer according to the invention, pan 3 | 22 |
| | MTMS bi-layer according to the invention, pan 4 | 22 |
| | MTMS bi-layer according to the invention, pan 5 | 20 |
| Comparative | MTMS/Silica/PDMS bi-layer, pan 3 | 9 |
| example 2 | MTMS/Silica/PDMS bi-layer, pan 4 | 9 |
| | MTMS/Silica/PDMS bi-layer, pan 5 | 10 |

A much higher level of non-stickiness is therefore noted after the 2-hour boiling water aging test, the FAN remains at the same level as before aging.

The invention claimed is:

1. A sol-gel finish layer of a non-stick coating of a household article, said layer forming a cooking surface and being free of silica and free of colloidal metal oxide.

2. The finish layer according to claim 1, being free of colloidal silica or micronic silica or mixtures thereof.

3. The finish layer according to claim 1, the sol-gel finish layer is obtained from a precursor which is an alkoxysilane selected from the group consisting of methyltrimethoxysilane (MTMS), methyltriethoxysilane (MTES), dimethyldimethoxysilane, and mixtures thereof.

4. The finish layer according to claim 1, further comprising a hydroxylated silicone oil.

5. A use of a sol-gel finish layer according to claim 1 for covering a household article and obtaining a non-stick coating.

6. A household article comprising a support covered with a sol-gel non-stick coating, said coating comprising at least two layers, a first sol-gel layer in contact with the support, and a second sol-gel finish layer free of silica and of colloidal metal oxide.

7. The household article according to claim 6 wherein the second layer is free of colloidal silica or micronic silica.

8. The household article according to claim 6, wherein the second layer has a thickness of 1 to 15 μm.

9. The household article according to claim 8, wherein the second layer has a thickness of 2 to 12 μm.

10. The household article according to claim 6, wherein the support is a hollow metal cap which comprises a bottom and a side wall rising from the bottom, said cap having a concave inner face adapted to receive food and a convex outer face intended to be disposed towards the heating means or a heat source.

11. A method for manufacturing a household article, comprising the following successive steps:

i. having a support comprising two opposite faces;

ii. shaping the support to obtain a concave face and a convex face;

iii. successively applying to the concave face of the support a sol-gel coating composition then a finish layer according to claim 1;

iv. applying to the article resulting from step (iii) a heat treatment at a temperature comprised from 200 to 400 °C;

v. obtaining a household article whose support is coated with a sol-gel non-stick coating.

* * * * *